United States Patent
Kerchner et al.

(10) Patent No.: US 7,048,201 B2
(45) Date of Patent: May 23, 2006

(54) GASKET AND HEAT SHIELD ASSEMBLY FOR A FLANGED JOINT

(75) Inventors: Douglas M. Kerchner, Goodrich, MI (US); Kurry B Emmons, Neshanic Station, NJ (US); Lawrence J Brophy, Franklin Park, NJ (US); Robert Lee Anderson, Commerce Township, MI (US)

(73) Assignees: General Motors Corporation, Detroit, MI (US); Metex Corporation, Edison, NJ (US)

( * ) Notice: Subject to any disclaimer, the term of this patent is extended or adjusted under 35 U.S.C. 154(b) by 0 days.

(21) Appl. No.: 11/074,197

(22) Filed: Mar. 7, 2005

(65) Prior Publication Data

US 2005/0166584 A1 Aug. 4, 2005

Related U.S. Application Data

(63) Continuation of application No. 10/440,807, filed on May 19, 2003, now Pat. No. 6,962,346.

(51) Int. Cl.
*F24D 19/06* (2006.01)

(52) U.S. Cl. .................................. 237/79; 277/602
(58) Field of Classification Search .............. 237/79, 237/12.3 R, 12.3 C; 165/41, 42
See application file for complete search history.

(56) References Cited

U.S. PATENT DOCUMENTS

| | | | | |
|---|---|---|---|---|
| 5,022,431 A | * | 6/1991 | Grey et al. | 137/375 |
| 6,318,734 B1 | * | 11/2001 | Boskamp | 277/598 |
| 6,640,927 B1 | * | 11/2003 | Turner | 181/252 |
| 2003/0080519 A1 | * | 5/2003 | Kerchner | 277/637 |

* cited by examiner

*Primary Examiner*—Derek S. Boles
(74) *Attorney, Agent, or Firm*—Carella Byrne; John G. Gilfillan, III; William Squire

(57) ABSTRACT

A heat shield and gasket assembly has three members including a first heat shield, a second heat shield, and a gasket. Each of the members has a flange portion and the flange portion of the gasket is sandwiched is between the flanges of the two heat shields. The flange portion of the gasket is thinner than the flange portions of the heat shields. The thinness of the gasket flange permits it to engage threaded assembly fasteners without compromising the thread integrity of the fasteners.

8 Claims, 5 Drawing Sheets

GASKET AND HEAT SHIELD ASSEMBLY FOR A FLANGED JOINT

This application is a continuation of application Ser. No. 10/440,807, filed May 19, 2003 now U.S. Pat. No. 6,962,346 incorporated by reference in its entirety herein.

TECHNICAL FIELD

This invention relates to gaskets and heat shields, and high temperature fluid handling systems, such as engine exhaust.

BACKGROUND OF THE INVENTION

In automobile exhaust systems, a series of pipes are interconnected to conduct the flow of hot exhaust gases from the engine to the tailpipe of the automobile. The pipes consist of a manifold pipe and a pipe leading from the exhaust manifold, which are interconnected with flanged members.

This portion of the exhaust system transmits the exhaust gas directly from the engine to a pipe or passage leading to the catalytic converter. The flanged connection between these pipes radiates a large amount of thermal energy, which can be detrimental to some of the more sensitive components that are positioned near this joint. These components might include electrical wires and pipes carrying fluid for the engine.

The flanged joint is insulated from the surrounding environment by a heat shield that is attached directly to one or both of the flange members and is separate from the gasket, which is compressed between the flange members. The gasket member, of course, prevents the direct leakage of exhaust fumes as the exhaust gases pass through the pipe and the shield protects the environment.

The shield requires extensive machining through the flanges so that the shield might be attached thereto, The heat shield also requires additional work by the assembler to place the shield in the proper location, and if not securely fastened, can result in a rattle or other disturbing noise within the engine compartment.

It has been proposed to provide a single assembly for the heat shield and gasket. One such device is shown in U.S. Ser. No. 09/999,7975 filed Oct. 31, 2001, now U.S. Pat. No. 6,811,159, assigned to General Motors, one of the assignees of the present invention.

SUMMARY OF THE INVENTION

A heat shield for a hot gas exhaust pipe system defining a longitudinal axis according to an embodiment of the present invention comprises a first heat shield member having a first flange portion and a first heat shield portion. The flange portion lies in a plane and defines a first aperture for receiving therein an exhaust pipe of the system. The first heat shield portion defines a three dimensional configuration extending generally transverse to the flange portion in a first direction for surrounding and facing at least a portion of the received pipe outer surface in two different planes extending along and facing the longitudinal axis. The flange portion includes apertures for attaching the heat shield member to the system.

According to a further embodiment, the shield member comprises an arcuate element that extends about the axis.

According to a still further embodiment, the arcuate element forms a U-shaped channel facing a portion of the peripheral surface of the received pipe in a continuous curve.

DESCRIPTION OF AN EXEMPLARY EMBODIMENT

Figure 1:
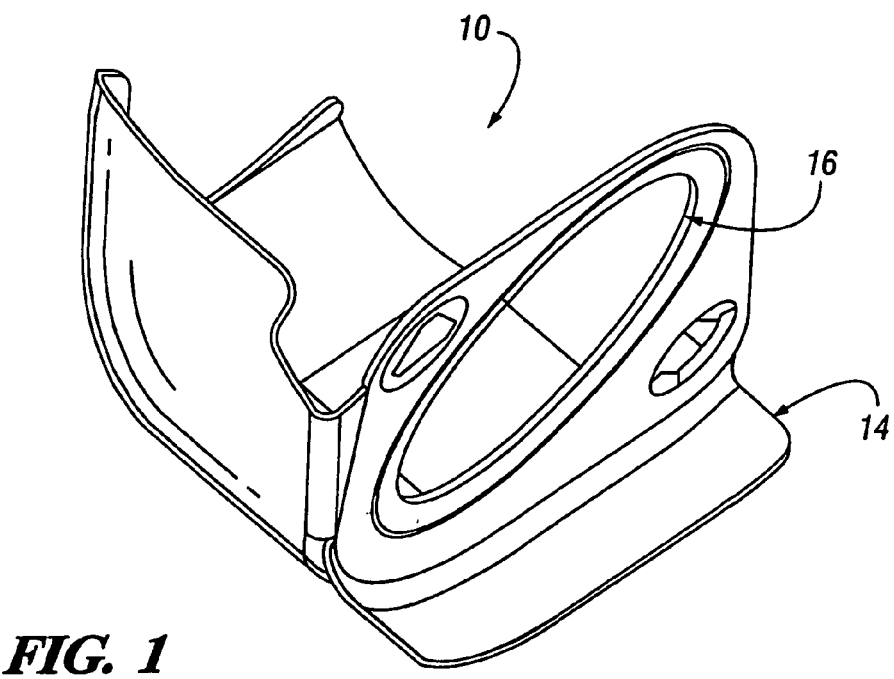
FIG. 1 is an isometric view of a heat shield and gasket assembly incorporating the present invention.

Referring to the drawings, wherein like characters represent the same or corresponding parts throughout the several views, there is seen in FIG. 1 a heat shield and gasket assembly 10 having a first heat shield component 12, a second heat shield component 14, and a gasket assembly 16.

Figure 2:
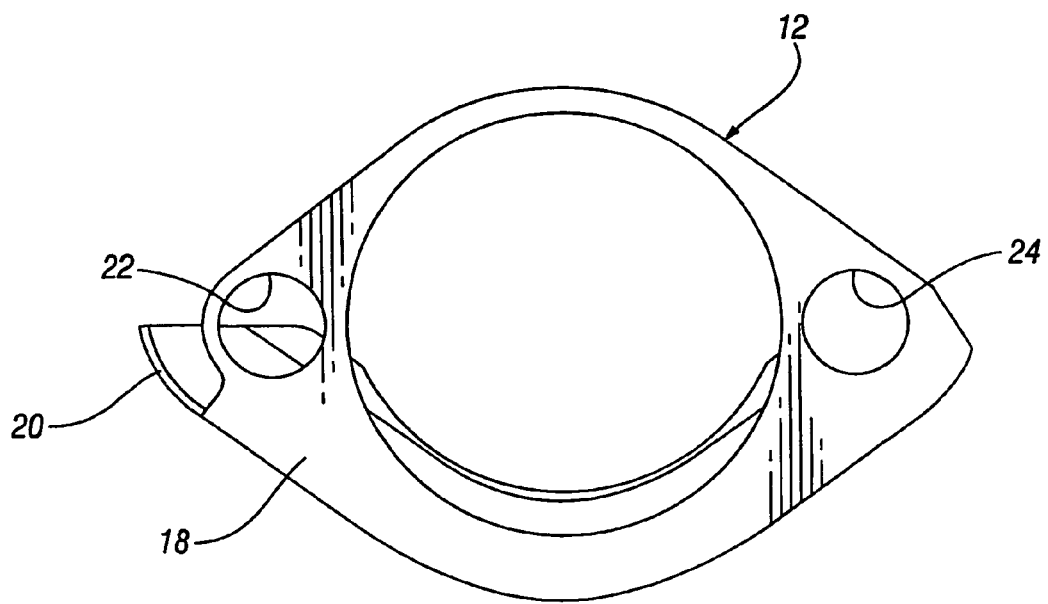
FIG. 2 is a bottom view of the heat shield used in the present invention.
Figure 3:
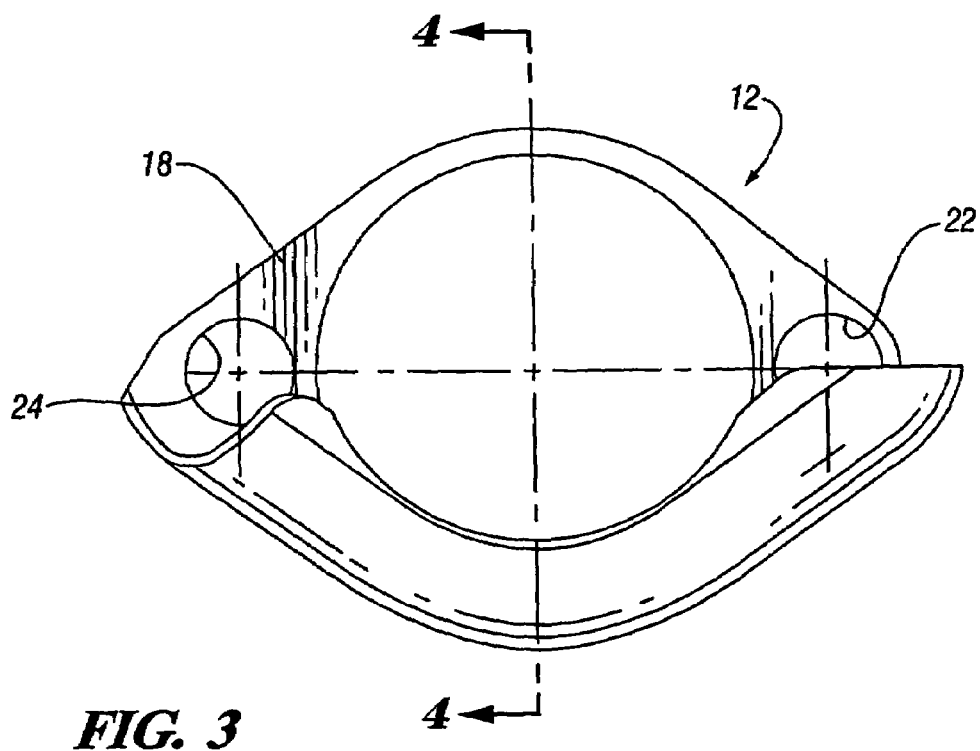
FIG. 3 is a top view of the heat shield shown in FIG. 2.
Figure 4:
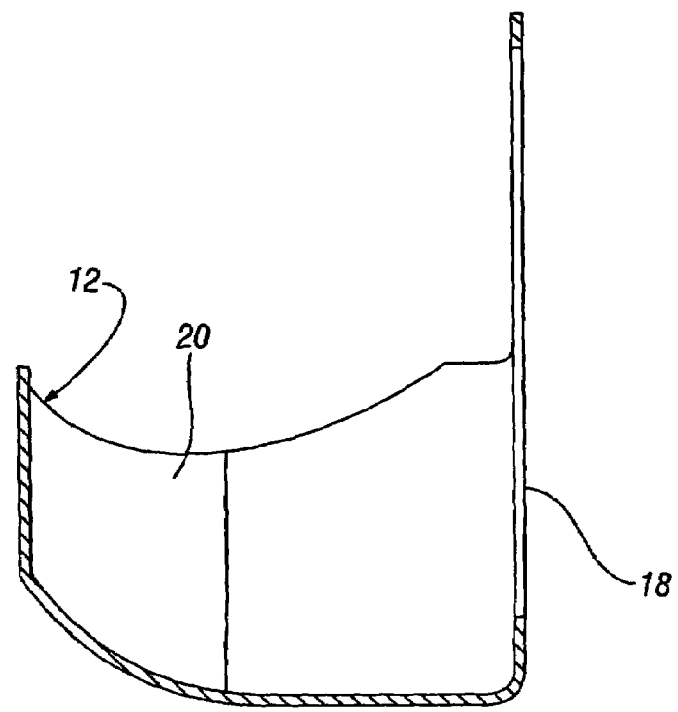
FIG. 4 is a view taken along line 4—4 of FIG. 3.

As seen in FIGS. 2, 3, and 4, the heat shield 12 has a flange portion 18 and a heat shield portion 20. The heat shield portion 20 flares outward from the flange portion 18. The heat shield 12 is preferably made of stainless steel and has a thickness in the range of 0.38 mm to 1.10 mm. The thickness of the flange portion 18 of the heat shield 12 is determined in part by the rigidity required for the heat shield and gasket assembly 10 to provide the necessary protection. The flange portion 18 has two openings 22 and 24.

Figure 5:
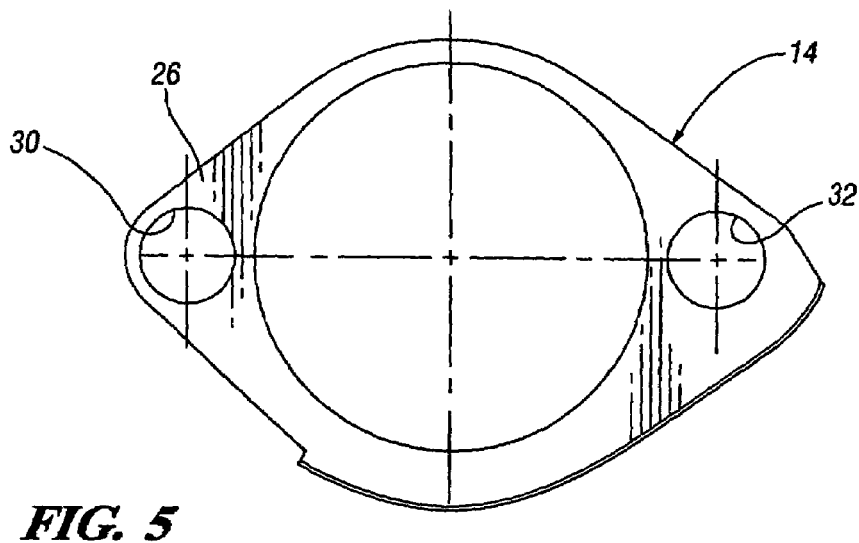
FIG. 5 is a bottom view of the other heat shield of the heat shield and gasket assembly.
Figure 6:
FIG. 6 is an end view of the second heat shield member.

As seen in FIGS. 5 and 6, the heat shield 14 includes a flange portion 26 and a shield portion 28. The shield portion 28 flares outwardly from the flange 26 and does not have as an extensive length as the shield portion 20 of the heat shield 12. The flange portion 26 has two openings 30 and 32, which align with the openings 24 and 22, respectively, of the flange 18 when the members are assembled. The shield 14 has a thickness considerably less than the thickness of the shield 12. The shield 14 is preferably made from stainless steel with a thickness in the range of 0.22 mm to 1.10 mm. Depending in part by the rigidity required for proper protection within the system, it will also be apparent to those skilled in the art that the shield portion 28 is considerably smaller than the shield portion 20. Therefore, the shield portion 28 need not be constructed from a blank having the same thickness as the shield portion 20. In some assemblies, the need for two heat shields may not be required such that the heat shield 14 may be omitted.

Figure 7:
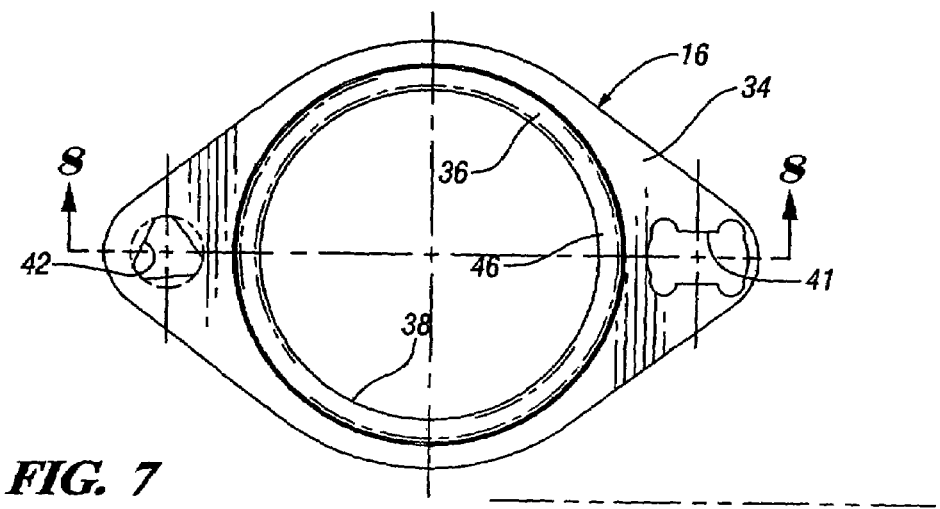
FIG. 7 is a top view of the gasket assembly.
Figure 8:
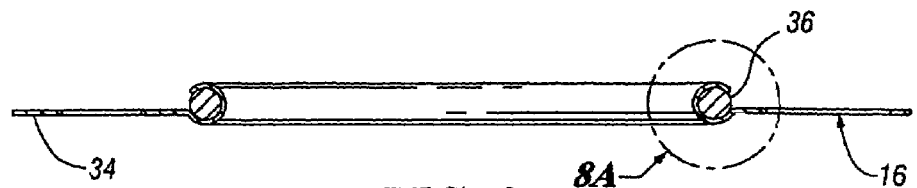
FIG. 8 is a view taken along line 8—8 of FIG. 7.
Figure 8A:
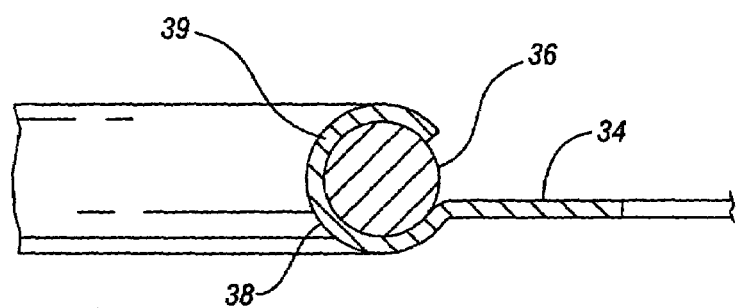
FIG. 8A is an enlarged view taken at the circle A in FIG. 8.

As seen in FIGS. 7, 8, and 8A, the gasket assembly 16 has a flange portion 34 and a gasket member 36. The gasket member 36 is secured in an opening 38 formed in the flange portion 34. The opening 38 has a curled edge 39, which is rolled around the gasket member 36 to retain the gasket member 36 in position. The gasket member 36 is preferably a mesh stainless steel ring, which is crushable during assembly to ensure proper sealing of the joint in which the heat shield and gasket assembly is used.

The flange portion 34 has two openings 41 and 42. The opening 41 is substantially I-shaped and the opening 42 is substantially triangular. The openings 41 and 42 are aligned between the openings 24, 30, and 22, 32. The opening 41 has outer edges which are spaced to be substantially equal to the diameter of the openings 22, 24, 30, and 32. The triangular opening 42 has an outer dimension at the curved apexes thereof which is slightly less than the diameters of the openings in the flanges 18 and 26. The flange portion 34 of the gasket assembly 16 is preferably made of stainless steel and has a thickness in the range of 0.18 mm to 0.22 mm.

Figure 9:
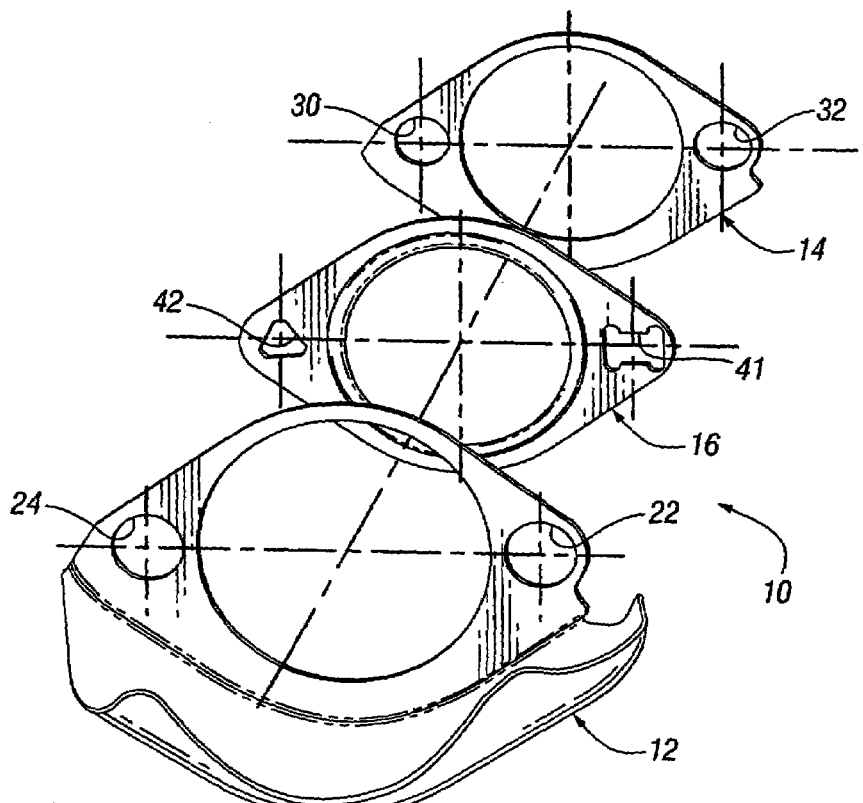
FIG. 9 is an exploded view of the heat shield and gasket members prior to assembly.

FIG. 9 is a depiction of the heat shield 12, the gasket assembly 16, and the heat shield 14 in an expanded view prior to assembly. When the members are assembled, as shown in FIG. 1, they are bonded together using conventional mechanical or chemical bonding processes. In the embodiment shown, the heat shield 12, gasket assembly 16 and heat shield 14 are spot welded at approximately four locations to form the assembly 10. As can be seen in FIG. 9, the openings 22, 41, and 32 are aligned at assembly and the openings 24, 42, and 30 are aligned at assembly.

Figure 10:
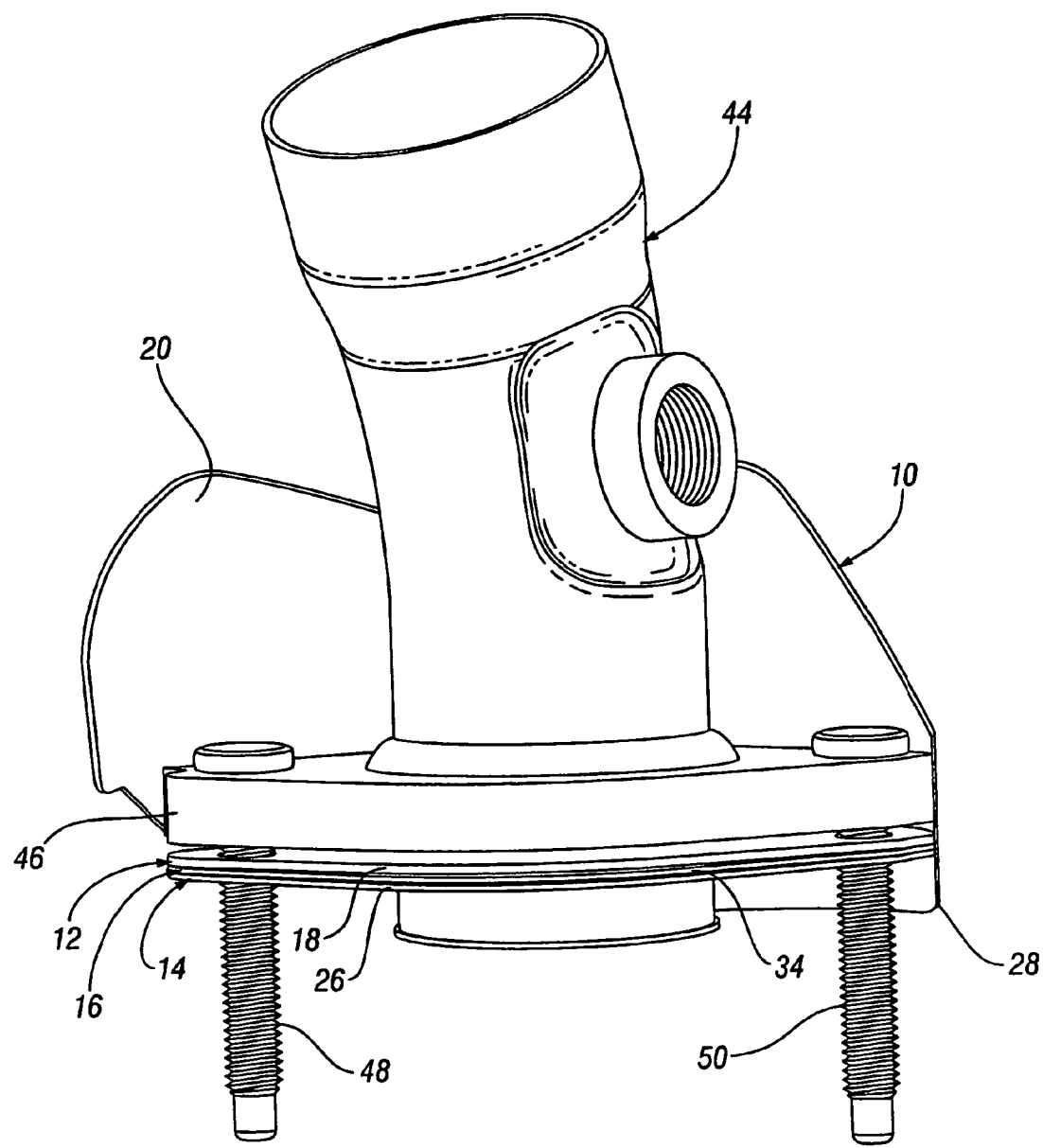
FIG. 10 is an isometric view of the heat shield and gasket assembly with a portion of an engine exhaust system in place.

After assembly of the heat shield and gasket 10, it may be placed in a system, which includes an exhaust pipe 44, as seen in FIG. 10. The exhaust pipe 44 includes a heavy flange member 46 to which is secured threaded fasteners 48 and 50. The threaded fastener 48 passes through the openings 24, 42 and 30, and the threaded fastener 50 passes through the openings 22, 41, and 32. The openings 24, 30, 22, and 32 are significantly larger than the outer diameter of the fastener 48. The openings 41 and 42 are shaped to engage the outer surface of the fasteners 48 and 50 as the exhaust pipe 44 is placed on the heat shield and gasket 10.

The gasket assembly 16, which contains the openings 41 and 42, is, as pointed out above, made of very thin material. One of the reasons for the thinness is so that the openings 41 and 42 will engage the fasteners 48 and 50 with sufficient force to maintain the assembly 10 in position but without marring the outer diameter of the threads on the fasteners 48 and 50.

Also, as pointed out above, the thickness of the flange 18 provides the rigidity for the assembly 10. The members 16 and 14 provide gasketing and heat shielding for the assembly 10. In particular, the gasket member 36 will be crushed between the flange 46 and a mating flange in the exhaust system, not shown. The collapsing of the gasket 36 prevents leakage of gaseous fluid between the flanges of the mating components. The heat shields 20 and 28 are positioned to reduce the amount of thermal energy that is radiated from the flange 46 and its mating flange, not shown.

What is claimed is:

1. A heat shield for a hot gas exhaust pipe system defining a longitudinal axis comprising:
   a first heat shield member having a first flange portion and a first heat shield portion, the flange portion lying in a plane and defining a first aperture for receiving therein an exhaust pipe of the system, the first heat shield portion defining a three dimensional configuration extending generally transverse to the flange portion in a first direction for surrounding and facing at least a portion of the received pipe outer surface in two different planes extending along and facing said longitudinal axis;
   the flange portion including apertures for attaching the heat shield member to the system; and
   a gasket member including a hot exhaust gas gasket formed of wire mesh having a second aperture aligned with the first aperture for receiving said pipe and a second flange portion having opposing surfaces, the second flange portion overlying and attached to the first flange portion at a first of said opposing surfaces.

2. The heat shield of claim 1 wherein said shield member comprises an arcuate element that extends about the axis.

3. The heat shield of claim 2 wherein the arcuate element forms a U-shaped channel facing a portion of the peripheral surface of the received pipe in a continuous curve.

4. The heat shield of claim 1 including a second heat shield member including a third flange portion and a second heat shield portion, the third flange portion for overlying and attached to the first flange portion at a second of said opposing surfaces wherein all said flange portions are juxtaposed.

5. The heat shield of claim 4 wherein the second heat shield portion defines a three dimensional configuration extending generally transverse to the third flange portion for surrounding and facing at least a portion of the received pipe of the system in two different planes extending along and facing said longitudinal axis in a second direction opposite to the first direction.

6. The heat shield of claim 5 wherein the second heat shield portion is arcuate.

7. The heat shield of claim 1 wherein the gasket member and the first heat shield member are each sheet metal wherein the gasket member is thinner than the first heat shield member.

8. The heat shield of claim 4 wherein the gasket member and the first and second heat shield members are each formed of sheet metal wherein the gasket member is thinner than the first and second heat shield members.

\* \* \* \* \*